United States Patent
Kim et al.

(10) Patent No.: US 9,440,145 B1
(45) Date of Patent: Sep. 13, 2016

(54) PROVIDING VIRTUAL ITEMS CONFIGURED TO FACILITATE TEMPORARY RESOURCE REQUIREMENT REDUCTION IN AN ONLINE GAME

(71) Applicant: KABAM, INC., San Francisco, CA (US)

(72) Inventors: John Kim, San Francisco, CA (US); David McNeill, San Francisco, CA (US); Albert Wei, San Francisco, CA (US); Christopher Yu, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 30 days.

(21) Appl. No.: 14/320,424

(22) Filed: Jun. 30, 2014

(51) Int. Cl.
*A63F 13/12* (2006.01)
*A63F 13/30* (2014.01)

(52) U.S. Cl.
CPC ..................... *A63F 13/12* (2013.01)

(58) Field of Classification Search
CPC .......... A63F 9/24; A63F 13/00; A63F 13/12; A63F 13/42
USPC ........................................................... 463/31
See application file for complete search history.

(56) References Cited

U.S. PATENT DOCUMENTS

| | | | |
|---|---|---|---|
| 8,133,116 B1 | 3/2012 | Kelly et al. | 463/31 |
| 8,210,940 B2 | 7/2012 | Carroll et al. | 463/29 |
| 9,005,032 B1 * | 4/2015 | Curtis | A63F 13/12 463/42 |
| 2007/0129126 A1 | 6/2007 | Van Luchene | 463/1 |
| 2014/0080600 A1 * | 3/2014 | Knutsson | A63F 13/12 463/31 |
| 2014/0128148 A1 * | 5/2014 | Soffin | A63F 13/00 463/25 |
| 2014/0364201 A1 * | 12/2014 | Tanibuchi | A63F 13/58 463/25 |
| 2015/0018091 A1 * | 1/2015 | Suzuki | A63F 13/12 463/29 |
| 2015/0080130 A1 * | 3/2015 | Tanibuchi | A63F 13/10 463/31 |
| 2015/0105147 A1 * | 4/2015 | Franzas | A63F 13/42 463/31 |

OTHER PUBLICATIONS

"The waiting game: Hands-on with Clash of Clans" written by Mike Foster, published on Jan. 22, 2014, and printed from URL <http://web.archive.org/web/20150320225242/http://www.engadget.com/2014/01/22/the-waiting-game-hands-on-with-clash-of-clans>, 6 pages.*
"Clash of Clans—Time Monetization Formulas Demistifyed" written by Wolfgang Graebner on Apr. 2, 2014, and printed from URL <http://www.gamasutra.com/blogs/WolfgangGraebner/20140402/214504/Clash_of_Clans_Time_Monetization_Formulas_Demistifyed.php>, 12 pages.*
"Clash of Clans" written by Wikipedia, published on or before Jan. 11, 2014, and printed from URL <http://web.archive.org/web/20140111030041/http://en.wikipedia.org/wiki/Clash_of_Clans>, 2 pages.*
Gems—Clash of Clans Wiki, http://clashofclans.wikia.com/wiki/Gems, printed on May 23, 2014, 2 pages.
Diamond—Hay Day Wiki, http://hayday.wikia.com/wiki/Diamond, printed Sep. 10, 2013, 1 page.

* cited by examiner

*Primary Examiner* — Jason Skaarup
(74) *Attorney, Agent, or Firm* — Sheppard Mullin Richter & Hampton LLP

(57) ABSTRACT

A system and method for facilitating resource requirement reduction in an online game are disclosed. Instances of resource requirement reduction items may be offered for purchase in an online store associated with the online game. A given resource requirement reduction item may be configured to reduce a type of game action requirements for game actions requested by a player during a corresponding time period subsequent to the activation of the instance of the resource requirement reduction item by the player. The player may activate a purchased instance of the requirement reduction item in the online game to reduce the game action requirements specified in the instance.

16 Claims, 5 Drawing Sheets

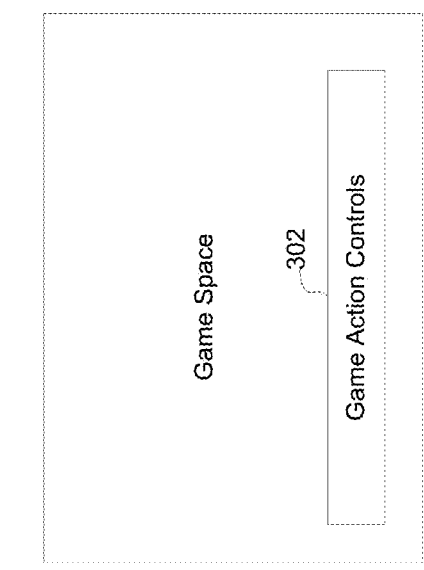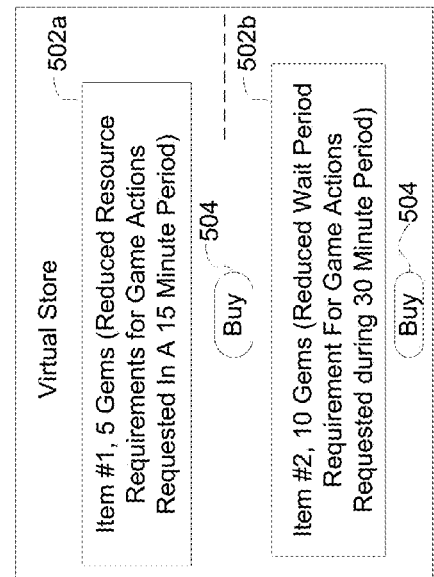

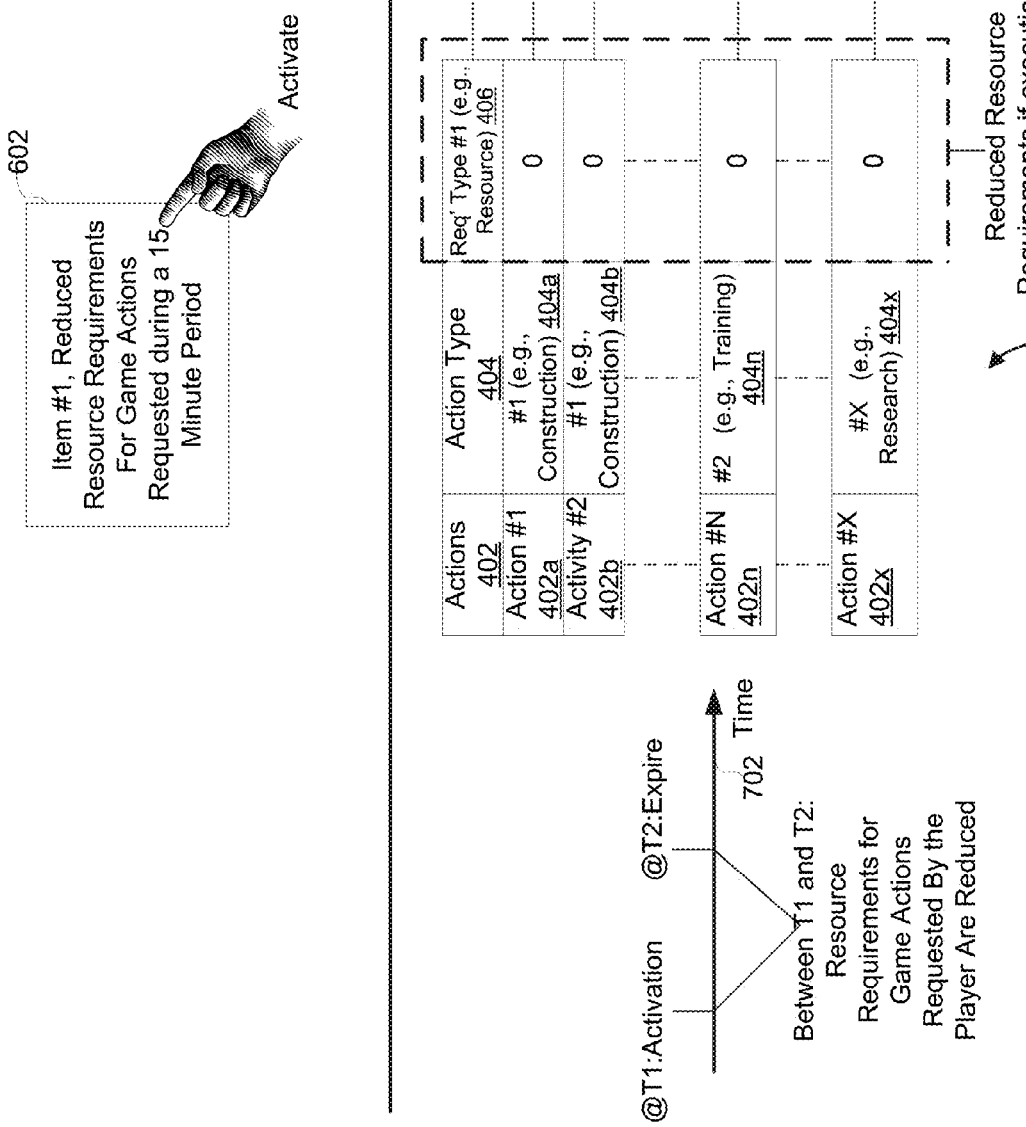

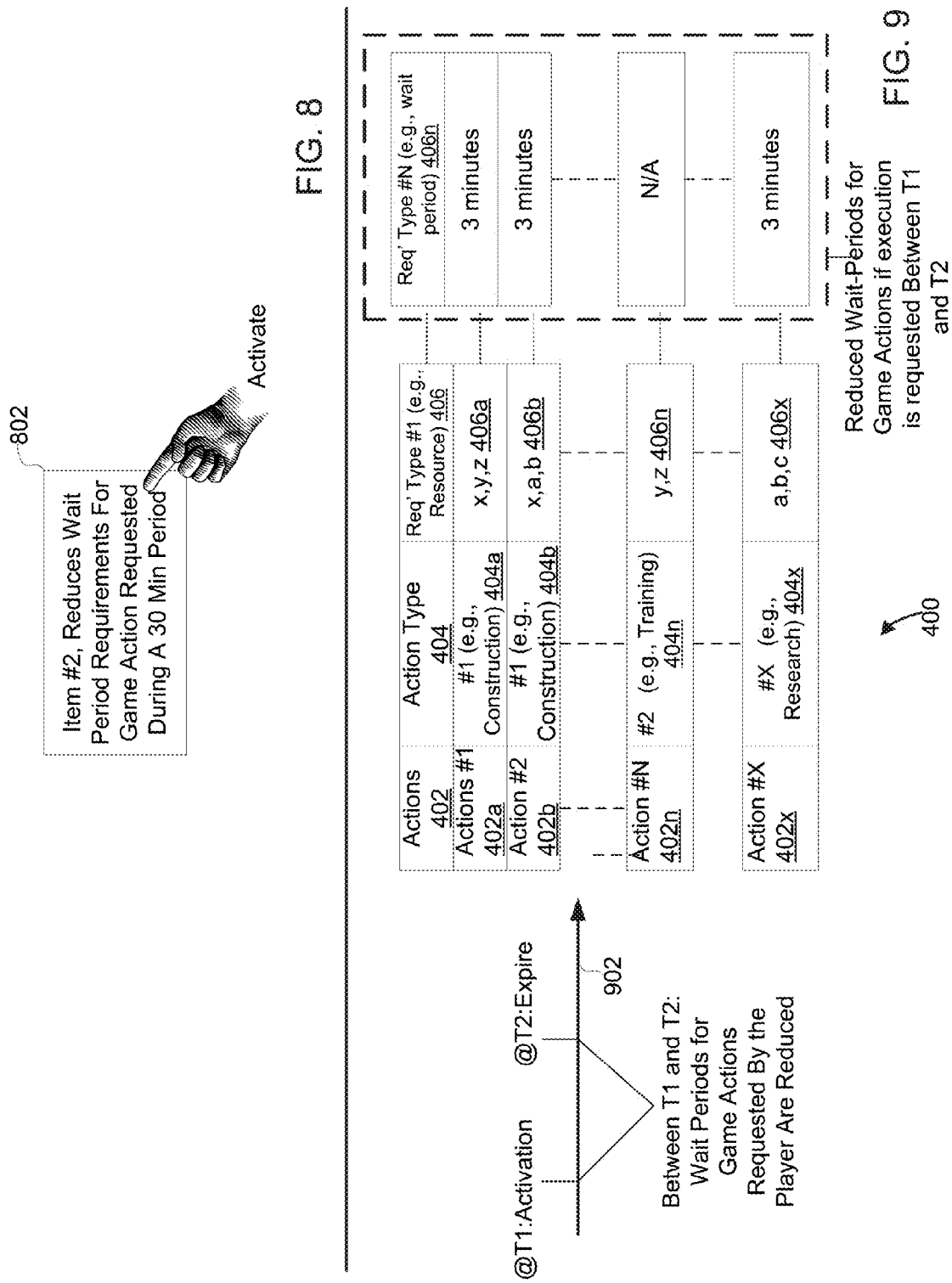

US 9,440,145 B1

PROVIDING VIRTUAL ITEMS CONFIGURED TO FACILITATE TEMPORARY RESOURCE REQUIREMENT REDUCTION IN AN ONLINE GAME

FIELD OF THE DISCLOSURE

This disclosure relates to providing virtual items for interaction by players in an online game, the virtual items being configured to facilitate temporary game action requirement reduction for players in the online game.

BACKGROUND

Online games that let players construct and/or manage organized game spaces are generally known. In those systems, the players are typically enabled to initiate requests to perform game actions in the game spaces through game interfaces implemented on client computers. For example, players may be enabled to build their game spaces from constituent parts—e.g., a building, a town, a city, a realm, a kingdom and/or any other constituent parts. In those online games, execution of some game actions may be instantaneous, such as maneuvering characters; and execution of some other game actions may be associated with various requirements. For example, the requirements may include a resource requirement that specifies a set of one or more resources that will be consumed by the execution of a corresponding game action; a wait-period requirement that specifies the player must wait for a time period before the execution of the game action completes; and/or any other requirements

SUMMARY

One aspect of the disclosure relates to providing virtual items in an online game to enable a player to reduce requirements for game actions requested during a time period. Instances of such virtual items may be offered to the player for purchase in an online store. The items may include wait-period reduction items, resource requirement reduction items, and/or any other items. An instance of a wait-period item may be purchased by the player and the player may activate the purchased instance to reduce wait periods for game actions requested by the player during a time period subsequent to the activation. An instance of a resource requirement reduction item may be purchased by the player and the player may activate the purchased instance to reduce resource requirements for the game action requested by the player during a time subsequent to the activation. Such virtual items may enhance monetization opportunities for the provider(s) of the online game and/or may enhance player engagement and/or retention in the online game.

A system configured to provide instances of activity requirement reduction items may include one or more servers. The servers may operate in client/server architecture with one or more client computing platforms. The client computing platforms may be associated with the players of the game space. The servers may be configured to execute one or more of: a game component, a player component, a store component, a wait-period reduction item component, a resource requirement reduction component, an activation component, and/or any other components.

The game component may be configured to execute an instance of an online game. The instance of the online game executed by the game component may be associated with a game space in which gameplays may be facilitated for players of the online game. Within the game space, players may control one or more elements in the game space. The players may input commands with specific parameters to undertake specific deeds, maneuvers, actions, functions, spheres of actions and/or any other types of interactions within the game space. Within the game space, activities may be provided for participation by the players. Common examples of activities that may be provided in the game space for player participation may include construction, crafting, researching, training, harvesting, mining, troop recruiting, troop marching, quest, upgrading activities, and/or any other types of activities in the game space. An activity provided in the game space may be associated with one or more activity requirements such that the one or more requirements must be satisfied by a player before the activities may become available for participation by the player in the online game.

Player component may be configured to access and/or manage one or more player profiles and/or player information associated with players of the online game. The player accounts managed by the player component may include a first player account associated with a first player of the online game.

The store component may be configured to present offers to sell instances of activity requirement reduction item to players. The store component may present such offers through a store interface representing a virtual store in the game space. Through the store interface, a player may be enabled to purchase an instance of activity requirement reduction item. For example, through the store interface implemented on a client computing platform, a player may click on an offer of an instance of activity requirement reduction item presented in the store interface to purchase the instance of activity requirement reduction item.

The wait period reduction item component may be configured to provide instances of wait-period reduction items in the game space. For example, the wait period reduction item component may provide instances of wait-period reduction items for players to purchase in an online store facilitated by the store component. The instances of the wait-period reduction item provided by the wait period reduction item component may be activated by the player, e.g., via the activation component, to reduce wait-periods for game actions requested by the players during time periods subsequent to the activation. Providing the instances of the wait period reduction items may involve obtaining configuration of the instances of the wait period reduction items. A configuration of a given instance of a wait period reduction item provided by the wait period reduction item component may include a time period during which wait periods for the game actions requested by the players will be reduced, the amount of wait-period reduction during that time period, one or more game actions (e.g., by action type 404) whose wait-period may be reduced during that period, and/or any other parameters. In some implementation, the configuration of the instance of the wait-period reduction item may include one or more action types such that wait-period requirement reduction as specify by the instance of the wait-period requirement reduction item may only apply to game actions having those action types.

The resource requirement reduction component may be configured to provide instances of resource requirement reduction items in the game space. For example, the resource requirement reduction item component may provide instances of resource requirement reduction items for players to purchase in an online store facilitated by the store component. The instances of the resource requirement reduction items provided by the resource requirement reduction component may be activated by the player, e.g., via the activation component 122, to reduce resource requirements for game actions requested by the players during time periods subsequent to the activation. A configuration of a given instance of a resource requirement reduction item may include a time period during which resource requirements for the game actions will be reduced, the amount of resource requirement reduction during that time period, one or more game actions whose resource requirement may be reduced, and/or any other parameters. In some implementation, the configuration of the instance of the resource requirement reduction item may include one or more action types such that resource requirement reduction as specify by the instance of the resource requirement reduction item may only apply to game actions having those action types.

The activation component may be configured to receive activation requests from players to activate instance of requirement reduction items purchased by the players. After receiving the activation requests, the activation component may be configured to activate the requested instances of requirement reduction items for the players, effectuate reduction of the requirements (e.g., wait-period and/or resource requirements) during a time period subsequent to the activation in accordance with the requirement reduction items, and/or perform any other operations to activate the requirement reduction items. Activation of the requested instance of requirement reduction item by activation component may include effectuating reduction of the requirements for the game actions requested during a time period subsequent to the activation. This may involve instructing the game component to temporarily override the wait-period and/or resource requirements for game actions requested by that player as specified by the activated instance of the requirement reduction items.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates one example of game action provided in the game space by the game component.

FIG. 3 illustrates facilitating game actions in the game space through a game interface.

FIG. 4 illustrates one example of managing game action requirements for individual game actions provided in the online game.

FIG. 5 illustrates one example of a store interface that presents offers of instances of requirement reduction items to players for purchase.

FIG. 6 Illustrates one example of activating an instance of resource requirement reduction item purchased by a player.

FIG. 7 illustrates one example of suspending resource requirements for a player in the game space.

FIG. 8 illustrates one example of suspending resource requirements for a player in the game space.

FIG. 9 illustrates one example of suspending wait-period requirements for a player in the game space.

DETAILED DESCRIPTION

Figure 1:
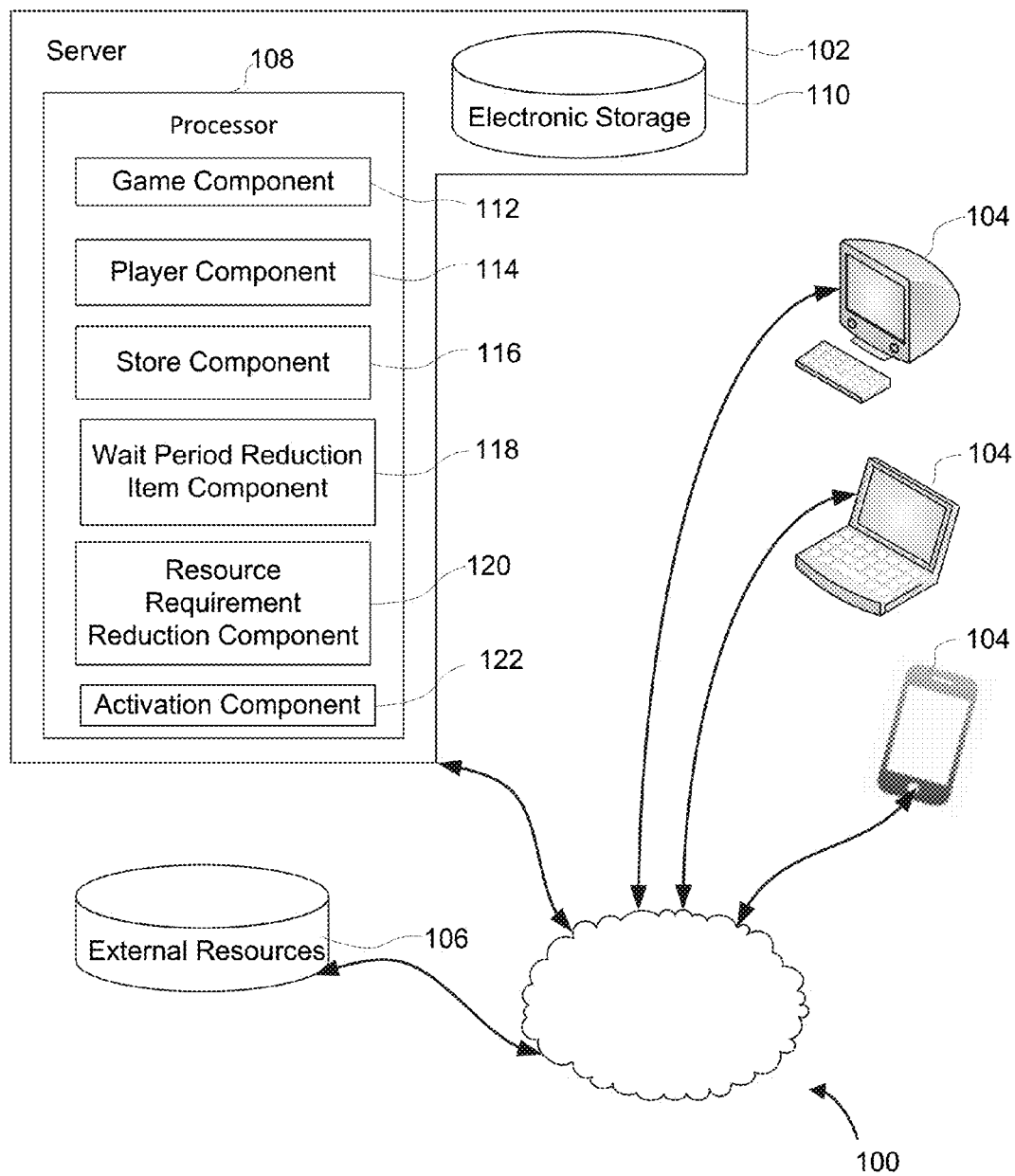
FIG. 1 illustrates one example of a system configured to facilitate game action requirement reduction in an online game in accordance with the disclosure.

FIG. 1 illustrates a system 100 to facilitate activity requirement reduction in an online game in accordance with the disclosure. Providing the online games may include hosting the online games over a network. In some implementations, as shown in this example, system 100 may include servers 102 configured for hosting online games. In this example, as shown, system 100 includes a server 102 configured for facilitating cross-game non-player character retreating in accordance with the disclosure. The servers 102 may be configured to communicate with one or more client computing platforms 104 according to client/server architecture, and with each other. The players may access system 100 and/or the game spaces associated with the online games via client computing platforms 104. As shown, the servers 102 may comprise processors 108 configured to execute computer readable instructions to implement system components. The computer program components may include one or more of a game component 112, a player component 114, an activity requirement component 116, a store component 118, an activity requirement reduction item component 120, an activation component 12, and/or other components.

The game component 112 may be configured to execute an instance of a game space to provide an online game. Within the instance of game space, players may interact with elements of the online game and/or with each other through gameplays. The gameplays may include role-playing, vehicular maneuvering, first-person shooter, real-time strategy, turn-based strategy, simulation, music or rhythm playing, social interaction, twitching and/or any other gameplays. The execution of the game space of the online game by game component 112 may include determining a state associated with the online game. The state may be communicated (e.g., via streaming visual data, via object/position data, and/or other state information) from server 102 to client computing platforms 104 for presentation to players. The state determined and transmitted to a given client computing platform 104 may correspond to a view for a player character being controlled by a player via the given client computing platform 104. The state determined and transmitted to a given client computing platform 104 may correspond to a location in a game space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player.

The online game may be persistent. That is, the online game may continue on whether or not individual players are currently logged in and/or participating in the online game. A player that logs out of the online game and then logs back in some time later may find the game space associated with the online game has been changed through the interactions of other players with the game space during the time the player was logged out. These changes may include changes to the game space, changes in the player's inventory, changes in other players' inventories, changes experienced by non-player characters, and/or other changes.

The game space of the online game, e.g., a game space that is accessible by players via clients (e.g., client computing platforms 104) may be simulated to present views of the game space to a player. The game space may have a topography, express ongoing real-time interaction by one or more players and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The game space of the online game may comprise game space characters that are automatically controlled in the game space of the online game. The automatically controlled game space characters may not be associated with any player within the online game. As such, the automatically controlled game space characters may be generated and/or developed by artificial intelligence configured with the server 102 by a provider, administrator, moderator, and/or any other characters related to the online game. These automatically controlled game space characters may evolve within the game space free from player controls and may interact with game space characters that are controlled by or associated with the players, other automatically controlled game space characters, and as well as the topography of the game space. Certain manifested traits may be associated with the automatically controlled game space characters in accordance with the artificial intelligence configured with the server 102. As used herein, such automatically controlled game space characters in the game space of the online game are referred to as "non-player characters".

The above description of the manner in which state of the game space associated with the online game as determined by game component 112 is not intended to be limiting. The game component 112 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the game space of the online game, the players may be enabled to control one or more elements in the game space associated with the online game. The player-controlled elements may include player-controlled characters, game space units (e.g., troops), objects (e.g., weapons, horses, vehicle and so on), simulated physical phenomena (e.g., wind, rain, earthquakes, and/or other phenomena), and/or other player-controlled elements. The player-controlled characters may include avatars that represent the players in the game space. The player controlled characters may include heroes, knights, commanders, leaders, generals and/or any other game space characters. The player-controlled characters may possess strength, skills, abilities, magic powers, knowledge, and/or any other individualized attributes. The game space units controlled by the player may include troops, cohorts, conscripts, bands, armies and/or any other game space entities that may be trained, recruited, captured, and/or otherwise acquired by player en mass. The objects controlled by the players may include weapons, mounts, vehicles, projectiles, magic items, wardrobes, boots, armor, knapsacks, medicine, healing potion, and/or any other virtual items that may be employed by the players for interaction within the online game.

In any case, the player-controlled elements may move through and interact with the game space (e.g., non-player entities, elements controlled by other players and/or topography in the game space) associated with the online game. The elements controlled by a given player may be created and/or customized by the given player. The given player may have an "inventory" of virtual goods and/or currency usable within the game space.

Interaction may be exercised through commands input by a given player through client computing platforms 104. The given player may interact with other players through communications exchanged within the game space. Such communications may include one or more of textual chat, instant messages, private messages, voice communications, and/or other communications. Communications may be received and entered by the players via their respective client computing platforms 104. Communications may be routed to and from the appropriate players through server 102 (e.g., through game component 112).

The given player may input commands with specific parameters to undertake specific deeds, actions, activities, functions, spheres of actions, activities, and/or any other types of interactions within the game space. For example, the given player may input commands to construct, upgrade and/or demolish virtual buildings; harvest and/or gather virtual resources; maneuver virtual player-controlled elements; train, heal, march, transport, reinforce, reassign, recruit, and/or arrange troops; attack, manage, create, demolish and/or defend cities, realms, kingdoms, and/or any other game space locations controlled by or associated with the players; craft or transport virtual items; interact with, compete against and cooperate with non-player characters and/or game space elements controlled by other players in combats; research technologies and/or skills; mine and/or prospect for virtual resources; complete missions, quests, and/or campaigns; exercise magic power and/or cast spells; and/or perform any other specific deeds, actions, functions, or sphere of actions, activities, and/or any other type(s) of interaction(s) within the game space. In some examples, the given player may input commands to compete against game space elements in an environment within the game space—i.e., Player vs. Environment (PvE) activities. In some examples, the given player may input commands to compete against each other within the game space—i.e., Player vs. Player (PvP) activities.

Executing the instance of the game space by the game component 112 may include executing player actions to facilitate player interactions with the game space and/or each other in response to receiving game space commands input by the players. Execution of the player action by the game component 112 may produce changes to the game state, which may reflect progresses and/or results of the player actions. In some examples, state changes caused by the execution of the player actions may be recorded in the electronic storage 110 to facilitate persistency throughout the game space of the online game. In some examples, execution of the player actions may not produce persistent changes to the game state (e.g., a player character jumping forward and backward successively may not produce any perceivable game state changes to other players).

Within the game space of the online game, resources may be provided to enable players to interact with the game space. Typically, resources provided in the game space of the instance of online game represent elements that may be used in the game space of the game space of the online game to fund or to be depleted by player actions, activities, and/or any other type(s) of player interaction(s) within the game space. Resources provided in the game space may be tangible such that they take on one or more physical forms. Tangible resources in the game space may require storage, transportation, and/or any other type(s) of handling. For example, virtual raw resources may be provided in the game space as tangible resources such that players may acquire, store, and/or transport them to construct building, craft items, fund various activities (e.g., researching, training, upgrading, and/or any other activities), and/or for any other purposes. Common examples of tangible resources provided in the game space of the game space of the online game may include ammunition, virtual raw resources (e.g., lumber, stone, coal, gold, copper, oil, fish, rice, incense, wheat, crystals, and/or other virtual raw resources), equipment usable in the game space (e.g., weapons, armors, vehicles, and/or any other type(s) of equipment), and/or any other tangible resources.

Resources provided in the game space the online game may be intangible such that they do not take on physical forms. Common examples of intangible resources provided in the game space may include virtual currencies, hit points, manna points, action points, health, strength, and/or any other type(s) of intangible resources. Players may be initially given such intangible resources in the game space, and may be facilitated to acquire them through interactions with the game space and/or with each other. For example, players may be given a number action points when they first join online game to fund their actions in the game space, and may be facilitated to "earn" action points through interactions with the game space and/or with other players.

Within the instance of the game space, virtual currencies may be provided to store and/or exchange of game space values. Units of the virtual currencies (for example, a gold, a gem, a silver, a coin, a token, and/or any other types of virtual currencies) may reflect game space values as determined by a provider, administrator, moderator, player, and/or any other entities related to the game space. Through one or more units of virtual currencies, game space values may be captured, stored, and circulated in the game space. As one non-limiting example, combinations of player actions, skills, virtual items, time, and/or any other game space elements may be captured, stored, and circulated through virtual currencies to reflect game space values created by player labor in interacting with the game space. For instance, a player may be provided 1,000 gems after prospecting and mining for the gems in the game space for a period of time with certain required mining equipment operable only by a skilled game space miner, which the player has expanded labor to become.

Within the instance of the game space executed by the game component 112, virtual currencies may be collected, earned, purchased, gifted, or otherwise acquired by the players. For example, the players may purchase the virtual currencies with real-world money consideration (e.g., credit payment through credit card, electronic vouchers provided by the provider of the game space, physical tokens, and/or any other types of real-world currencies) through a virtual store. The players may earn the virtual currencies, for example through gameplays provided in the game space (e.g., PvP activities, PvE activities, in-game tournaments, tasks, quests, missions, and/or any other gameplays in the game space). By way of non-limiting example, a given player may earn a predetermined amount of virtual currencies after completing an in-game task in the game space. In some examples, the provider of the game space may simply make a certain amount of virtual currencies available, for instance through treasure troves in the game space such that the players may gratuitously collect the virtual currencies by exploring for the treasure troves. The players may acquire virtual currencies by receiving gifts that comprise virtual currencies from other players. One of ordinary skills in the art will appreciate that there are other ways for the players to acquire virtual currencies in the game space.

Within the instance of the game space executed by the game component 112, virtual raw resources may be, for example, generated, cultivated, mined, harvested, purchased, earned, consumed, traded, and/or gifted over time by units, characters, pets, buildings, facilities, and/or any other infrastructure or entity in the game space for the player. Virtual raw resources may be prospected. Virtual raw resources may be virtual items of value that can be accumulated through participation in the game space, rather than virtual currencies that store values in the game space as described above. As such, resources may be used to satisfy resource requirements in the game space. By way of non-limiting examples, virtual raw resources may include food (e.g., rice, fish, wheat, etc.), minerals (e.g., wood, iron, ore, coal, oil, stone, crystal, etc.), plants, animals, and/or any other resources appropriate for the game space. Transfer of resources between players may be reflected through player inventories such that the transferor player's inventory reduces an amount of the transferred resources that are added to the transferee player.

Within the instance of the game space executed by the game component 112, game actions may be provided to the players for interacting with game space. Common examples of game actions that may be provided in the game space may include construction, crafting, researching, training, harvesting, mining, troop recruiting, troop marching, quest, upgrading, and/or any other types of game actions in the game space. Typically, execution of a given game action may be associated with a resource requirement. The resource requirement for the given game action may specify a set of resources that will be consumed during the execution (or upon the execution) of the given game action. For example, without limitation, a crafting game action may consume a combination of virtual raw resources, such as 100 iron, 300 stone, 150 lumber, 20 gold, and/or any other virtual raw resources for producing a virtual item usable in the game space such as a weapon, an armor, a decorative item, a magic item and/or any other virtual items. As another example, a research game action may consume a combination of virtual raw resources for producing a new technology for the player.

Still as another example, a construction game action may consume a combination of virtual raw resources for producing a new building in the game space for the player.

Execution of some game actions in the game space may require wait periods until completion. Such wait periods may be determined by the provider, administrator, moderator, and/or any other entities related to the game space to reflect processes associated with execution of these actions in the game space. Typically, game actions such as crafting virtual items, constructing virtual buildings, training troops, mining for resources, farming for food supplies, manufacturing industrial outputs, and/or any other game actions reflecting corresponding processes in the game space may require extended periods of time for completion as determined by the provider(s) of the game space. For example, a game action of constructing a virtual building in the game space may be determined by the provider of the game space to take 3 hours to complete by the game component 112 on behalf of the player. In that example, the virtual building will be available for the player to use in the game space 3 hours from the time when the player first initiated the building construction action in the game space.

As described herein, a wait period of a game action may be referred to as an amount of time required for the execution of the game action to be completed in the game space by the game component 112 starting from the time when the game component 112 first receives a request from a player to execute the game action. As described herein, a pending wait period of an active game action may be referred to as the amount of time left for in the execution of the active game action by game component 112. Typically, a pending wait period of a game action that is active is a portion of the wait period of that game action.

FIG. 2 illustrates one example of game action provided in the game space by the game component 112. As shown, the game action 204 may be associated with a set of requirements, such as, resource requirements, wait period requirements and/or any other requirements. FIG. 3 illustrates facilitating game actions in the game space through a game interface. The game interface 300 shown in FIG. 3 may be implemented on client computing platform 104 illustrated in FIG. 1. As shown the game interface 300 may provide a set of game action controls for players to request execution of the game actions in the game space. For example, without limitation, the game action controls 302 may include a construction action control that enables the player to request construction of a building in the game space.

Returning to FIG. 1, common examples of the activity requirements in the game space may include resource, wait-period, technology, level, ability, skill, building, equipment, unit, role, social connection requirement, and/or any other type(s) of requirement(s) desired by the provider(s) of the online game. Technology requirements associated for the game actions may specify one or more technologies must have been acquired by the player before the activities may become available in the game space for participation by the player, for example, in accordance with a technology tree in the online game. For instance, as an illustration, a research game action for acquiring construction technology may be associated with a technology requirement such that the player must have acquired masonry technology before such a research activity may become available to the player in the game space. The equipment requirements associated with the game actions may specify one or more pieces of equipment must have been acquired by the player in the game space before the activities may become available for the player in the game space. For instance, a crafting game action may be associated with an equipment requirement such that the player must have acquired a piece of special welder before the player may be enabled to initiate the crafting activity in the game space. The building requirements associated with the game actions may specify one or more buildings must have been constructed by the player before the activities may become available for the player in the game space, for example, in accordance with a building tree in the inline game. For instance, a construction game action may be associated with a building requirement such that the player must have constructed a castle before the construction activity becomes available for the player in the game space. The skill, ability, role, and/or other activity requirements related to player attributes may require the player to have acquired certain player attribute(s) in the online game before the activities may be executed in the game space. For instance, an in-game quest may be associated with an ability requirement such that the player must have acquired a specific ability (e.g., foresight) before the in-game quest may be executed for the player in the game space.

It should be appreciated that game action requirements may not only be limited to aspects related to game progression, gameplays and/or player progression in the game space. For example, the game action requirements may include requirements related to social interactions by the player within and/or outside of the game space. For instance, without limitation, the game actions may be associated with friend connection requirements such that the player must have connected with a certain number friends in the game space before the game actions may be executed for the player in the game space.

FIG. 4 illustrates one example of managing game actions requirements for individual game actions provided in the online game. As can be seen, a table 400 may be employed for managing game action requirements for the individual activities provided in the online game. As shown, a given game action 402 may be associated with a corresponding action type 404 that categorizes a sphere of actions or gameplays enabled by the given game actions 402 in the game space. As shown, the action type 404 may include construction, training, researching, and/or any other activity type. As also illustrated in FIG. 4, a given game action 402 may be associated with a number of requirements 406, such as the game action requirements 406a, 406n shown in this example, such that action requirements 406 must be satisfied before the game actions may be executed in the game space. It should be noted that different activities in the game space may be associated with different types of activity requirements. For instance, as illustrated, activities having a construction type—i.e., the construction activities—may be associated with technology requirements; while activities having a training type—i.e., the training activities—may not be associated with technology requirements.

Returning to FIG. 1, player component 114 may be configured to access and/or manage one or more player accounts associated with the players of the online game. The individual player accounts may comprise player profiles and/or player information associated with players. The one or more player profiles and/or player information may include information stored by server 102, one or more of the client computing platforms 104, and/or other storage locations. The player information associated with a given player may comprise one or more player parameters related to the given player. The one or more player parameters may include, but not limited to, a language spoken by, a geolocation of, an age group of, a time zone of, a level of experience related to the game space by, a level of activity level by the given player, and/or any other player parameters associated with the given player. The level of experience of the given player may include and/or indicate a rank of the player in the game space, cumulative experience points (XP) acquired by the given player in the game space, a skill level of the given player in the game space, a level of progression of the given player in the game space, or any other progressive aspects indicating a status of the given player in the game space.

The player information may include information related to purchases or spending by the given player in or for the game space. Such spending information may include, for example, purchase information for individual transactions, a spend rate, a total spend amount, and/or other information related to player purchases. The spending information associated with a given player may indicate a level of spending by the given player within the game space, for example, without limitation, lifetime spending (total spending by the given player in the game space), average spending during certain predetermined periods (e.g., spending by the given player during thanksgiving, Christmas and/or any other periods), spending by the given player during certain events within the game space (e.g., spending by the given player during a specific tournament, quest, contest, and/or any other types of game space events), and any other spending information by the given player.

The player profiles may include, for example, information identifying players (e.g., a player name or handle, a number, an identifier, and/or other identifying information) within the game space, security login information (e.g., a login code or password), game space account information, subscription information, virtual currency account information (e.g., related to currency held in credit for a player), relationship information (e.g., information related to relationships between players in the game space), game space usage information, demographic information associated with players, interaction history among players in the game space, information stated by players, purchase information of players, browsing history of players, a client computing platform identification associated with a player, a phone number associated with a player, and/or other information related to players. The player information managed by the player component 114 may include information indicating levels of interaction with the game space by individual players. The interaction level of an individual player as indicated in such information may reflect an amount of interaction with the game space by the individual player.

Returning to FIG. 1, the store component 116 may be configured to present offers to sell instances of virtual items to players. The store component 118 may present such offers through a store interface representing a virtual store in the game space. Such a store interface may be implemented on client computing platforms 104. Through the store interface, a player may be enabled to purchase an instance of a requirement reduction item. For example, through the store interface implemented on a client computing platform, a player may click on an offer of an instance of activity requirement reduction item presented in the store interface to purchase the instance of the requirement reduction item.

FIG. 5 illustrates one example of a store interface that presents offers of instances of requirement reduction items to players for purchase. As shown, the store interface 500 may present offers 502 of instances of requirement reduction items for purchase by players. As illustrated in this example, the offers of instances of the requirement reduction items for purchase through the store interface 500 may include an offer 502a and an offer 502b. As shown, offers like offer 502a may be provided to enable the players to purchase an instance of a virtual item configured to reduce resource requirements for game actions in the game space during a time period subsequent to the activation of the instance of the virtual item in the game space. As also shown, offers like offer 502b may be provided to enable the players to purchase an instance of wait-period requirement reduction item configured to reduce suspend wait-period requirements in the game space for a time period subsequent the activation of the instance of the wait-period requirement reduction item. As can be seen from FIG. 5, the players may be enabled to accept the offers 502a and 502b through field controls 504 such that the players are facilitated to pay an amount of consideration, i.e., 5 gems and 10 gems, specified in offers 502a and 502b, respectively, to purchase instances of the requirement reduction items.

Returning to FIG. 1, the wait period reduction item component 118 may be configured to provide instances of wait-period reduction items in the game space. For example, the wait period reduction item component may provide instances of wait-period reduction items for players to purchase in an online store facilitated by the store component 116. The instances of the wait-period reduction item provided by the wait period reduction item component 118 may be activated by the player, e.g., via the activation component 122, to reduce wait-periods for game actions requested by the players during time periods subsequent to the activation. For example, without limitation, instances of a first wait-period reduction item may be provided to enable a player to reduce wait periods for game actions requested, e.g., initiated by the player via game action controls, by the player during a 15 minute time period subsequent the activation. As another example, without limitation, instances of a second wait-period reduction item may be provided to enable a player to reduce wait periods for game actions requested by the player during a 30 minute time period subsequent the activation. Instances of the first wait-period reduction item may be offered in the online store for purchase for a lower consideration (e.g., 5 unit of virtual currency) than the second wait-period reduction item (e.g., 10 unit of virtual currency).

Providing the instances of the wait period reduction items may involve obtaining configuration of the instances of the wait period reduction items. A configuration of a given instance of a wait period reduction item provided by the wait period reduction item component 118 may include a time period during which wait period for the game actions requested by the player will be reduced, the amount of wait-period reduction during that time period, one or more game actions (e.g., by action type 404) whose wait-period may be reduced during that period, and/or any other parameters.

By way of non-limiting example, a configuration of an instance of a wait period reduction item may specify that wait period of game actions requested by the player in a 15 minute time period subsequent to the activation will be reduced to 0 minutes such that requested game actions will be instantly executed. For instance, execution of a game action requested by the player, which normally takes extended period of time to complete (e.g., hours, days), will be instantly completed during that 15 minute period if the player requests the execution of the game action. For example, a player may have a number of game actions available for the player to request execution in the game space, which may include a construction action to build a barrack, a research action to acquire a new technology, a crafting action to craft a new item, an upgrade action to upgrade an existing building, a training action to "train" a number of troops, and/or any other game actions. In that example, if the player request to execute some or all of the those game actions during the 15 minute period subsequent to the activation of the instance of the wait-period reduction requirement item, those game actions will be completed instantly. As another example, an instance of the wait-period reduction item may specify that the wait-period required for construction action in the game space will be reduced to 3 minutes subsequent to the activation of the instance of the wait-period reduction item.

In implementations, wait period reduction item component 118 may be configured to obtain the configuration of a given instance of a wait-period reduction item. For example, the configuration may be obtained from an administrator of the game space via an interface, from a file preconfigured by the provider(s) of the online game, dynamically determined in accordance with one or more programming rules, and/or in any other ways. By way of non-limiting example, the configuration of the instance of the wait-period reduction item may be dynamically determined based on a play rate in the game space. For example, the instance of the wait-period reduction item may be determined wait periods for the game actions are reduced more significantly when a play rate in the game space is low; and less wait-periods for the game actions are reduced when a play rate in the game space is high.

In some implementations, the time period obtained for configurations of wait-period reduction items may be a time period during which the player interacts with the game space. For example, as an illustration, the obtained time period may be 15 minutes during which the player interacts with the game space. That is, if the player logs off the game space within 10 minutes after activation of the instance of wait-period requirement reduction item, the player would still have 5 minutes remaining time for after the player logs back into the game space such that the wait-periods for the game actions are reduced in accordance with the instance of wait-period requirement reduction item during that 5 minute remaining time period. In some implementations, the time period may be a real-world time period. Still using the example described above, in those implementations, if the player logs off the game space within 10 minutes after activation of the instance of wait-period requirement reduction item, the player may not be able to take advantage of the activated wait-period requirement reduction item if the player log back into the game space 6 minutes later.

In some implementation, the configuration of the instance of the wait-period reduction item may include one or more action types such that wait-period requirement reduction as specify by the instance of the wait-period requirement reduction item may only apply to game actions having those action types. By way of non-limiting example, the instance of the wait-period requirement reduction item may specify that wait periods will be reduced for construction actions requested by the player (only) during a 15 minute window subsequent to the activation. As another non-limiting example, the instance of the wait-period requirement reduction item may specify that wait periods will be reduced for construction actions and crafting actions (only) during the 15 minute window subsequent to the activation.

The resource requirement reduction component 120 may be configured to provide instances of wait-period reduction items in the game space. For example, the resource requirement reduction item component may provide instances of resource requirement reduction items for players to purchase in an online store facilitated by the store component 116. The instances of the resource requirement reduction items provided by the resource requirement reduction component 120 may be activated by the player, e.g., via the activation component 122, to reduce resource requirements for game actions requested by the players during time periods subsequent to the activation. For example, without limitation, instances of a first resource requirement reduction item may be provided to enable a player to reduce resource requirements for game actions requested, e.g., initiated by the player via game action controls, by the player during a 15 minute time period subsequent the activation. As another example, without limitation, instances of a second resource requirement reduction item may be provided to enable a player to reduce resource requirements for game actions requested by the player during a 30 minute time period subsequent the activation. Instances of the first resource requirement reduction item may be offered in the online store for purchase for a lower consideration (e.g., 5 unit of virtual currency) than the second resource requirement reduction item (e.g., 10 unit of virtual currency).

Providing the instances of the resource requirement reduction items may involve configuring the instances of the resource requirement reduction items. A configuration of a given instance of a resource requirement reduction item may include a time period during which resource requirements for the game actions requested by a player will be reduced, the amount of resource requirement reduction during that time period, one or more game actions (e.g., by action type 404) whose resource requirement may be reduced, and/or any other parameters.

By way of non-limiting example, a configuration of an instance of a resource requirement reduction item may specify that resource requirements of game actions requested by a player during a 15 minute time period subsequent to activation will be reduced to 0 such that execution of the requested game actions will not consume any resources. For instance, if a user requests execution of a game action during the 15 minute time period, which normally requires a set of resources for execution (e.g., 100 stone, 500 lumber, 200 gold), the execution of the game action will not consume any of the resources. For example, a player may have a number of game actions available for execution by the player in the game space, which may include a construction action to build a barrack, a research action to acquire a new technology, a crafting action to craft a new item, an upgrade action to upgrade an existing building, a training action to "train" a number of troops, and/or any other game actions. In that example, the user may request to execute some or all of those game actions during the 15 minute time period subsequent to activation such that the execution of those game actions will not consume any resources. As another example, an instance of the resource requirement reduction item may specify that resource requirements for construction action in the game space will be reduced by certain amount (e.g., the number of store required may be reduced by 100, the number of lumber required may be reduced by 200, the number of gold required may be reduced by 10) subsequent to the activation.

In implementations, resource requirement reduction item component 118 may be configured to obtain the configuration of a given instance of a resource requirement reduction item. For example, the configuration may be obtained from an administrator of the game space via an interface, from a file preconfigured by the provider(s) of the online game, dynamically determined in accordance with one or more programming rules, and/or in any other ways. By way of non-limiting example, the configuration of the instance of the resource requirement reduction item may be dynamically determined based on a play rate in the game space. For example, the instance of the resource requirement reduction item may be determined to include a longer time period during which the resource requirements for the game actions are reduce when a play rate in the game space is low; and include a shorter time period during which the wait periods for the game actions are reduce when a play rate in the game space is high.

In some implementations, the time period obtained for configurations of wait-period reduction items may be a time period during which the player interacts with the game space. For example, as an illustration, the obtained time period may be 15 minutes during which the player interacts with the game space. That is, if a player logs off the game space within 10 minutes after activation of the instance of resource requirement reduction item, the player may still have 5 minutes remaining time for the resource requirements reduction in the game space after the player logs back into the game space. In some implementations, the time period may specify a real-world time period. Still using the example described above, in those implementations, if the player logs off the game space within 10 minutes after activation of the instance of resource requirement reduction item, the player would not be able to take advantage of resource requirement reduction if the player log back into the game space 6 minutes later.

In some implementation, the configuration of the instance of the resource requirement reduction item may include one or more action types such that resource requirement reduction as specify by the instance of the resource requirement reduction item may only apply to game actions having those action types. By way of non-limiting example, the instance of the resource requirement reduction item may specify that resource requirements will be reduced for construction actions (only) during a 15 minute window subsequent to the activation. As another non-limiting example, the instance of the resource requirement reduction item may specify that resource requirements will be reduced for construction actions and crafting actions (only) during the 15 minute window subsequent to the activation.

The activation component 122 may be configured to receive activation requests from players to activate instance of requirement reduction items purchased by the players. After receiving the activation requests, the activation component 122 may be configured to activate the requested instances of requirement reduction items for the players, effectuate reduction of the requirements (e.g., wait-period and/or resource requirements) during a time period subsequent to the activation in accordance with the requirement reduction items, and/or perform any other operations to activate the requirement reduction items. FIG. 6 Illustrates one example of activating an instance of resource requirement reduction item purchased by a player. It will be described with reference to FIG. 5. As illustrated, the player may be facilitated to manipulate (e.g., click on) a purchased instance of resource requirement reduction item, such as the instance of resource requirement reduction item 602 offered for purchase in the offer 502*a* as illustrated in FIG. 5. For instance, in one implementation, activation of the instance of resource requirement reduction item 602 may be facilitated through an inventory interface enabling the player to act on an instance of resource requirement reduction item purchased by the player and stored in the player inventory.

FIG. 8 Illustrates one example of activating an instance of wait-period reduction item purchased by a player. It will be described with reference to FIG. 5. As illustrated, the player may be facilitated to manipulate (e.g., click on) a purchased instance of resource requirement reduction item, such as the instance of resource requirement reduction item 802 offered for purchase in the offer 502*b* as illustrated in FIG. 5. For instance, in one implementation, activation of the instance of wait-period reduction item 802 may be facilitated through an inventory interface enabling the player to act on an instance of wait-period reduction item purchased by the player and stored in the player inventory.

Returning to FIG. 1, activation of the requested instance of requirement reduction item by activation component 122 may include effectuating reduction of the requirements for the game actions requested during a time period subsequent to the activation. This may involve instructing game space component 112 to temporarily override the wait-period and/or resource requirements for that player as specified by the activated instance of the requirement reduction items. For instance, in one implementation, a control command may be transmitted by the activation component 122 to the game space component 112 instructing the game component 112 to override the resource requirements for the game actions requested by the player during a time period as specified by an instance of resource requirement reduction item activated by the player.

FIG. 7 illustrates one example of suspending resource requirements for a player in the game space. It will be described with reference to FIG. 4. As can be seen from FIG. 7, in this example, responsive to a player's activation of an instance of resource requirement reduction item configured to suspend resource requirements for game actions in the game space, table 400 may be updated so that resource requirements may be reduced to 0 with the game actions for the player that activated the instance of resource requirement reduction item in the game space temporarily (e.g., fifteen minutes). In this example, after the expiration of the fifteen minutes, table 400 may be restored to that shown in FIG. 4 so as to the resource requirements may be re-enforced for the player in the game space.

FIG. 9 illustrates one example of suspending wait-period for a player in the game space. It will be described with reference to FIG. 4. As can be seen from FIG. 9, in this example, responsive to a player's activation of an instance of wait-period reduction item configured to suspend wait-period for game actions in the game space, table 400 may be updated so that wait-periods of game actions may be reduced to 3 minutes for the player in the game space temporarily (e.g., 30 minutes). In this example, after the expiration of the fifteen minutes, table 400 may be restored to that shown in FIG. 4 so as to the wait-period requirements for the game actions may be re-enforced for the player in the game space.

Returning to FIG. 1, the server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or player associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122. Processor 108 may be configured to execute components 112, 114, 116, 118, 120, 122 by software; hardware; firmware; some combination of software, hardware, and/or firmware; and/or other mechanisms for configuring processing capabilities on processor 108.

It should be appreciated that although components 112, 114, 116, 118, 120, 122 are illustrated in FIG. 1 as being co-located within a single processing unit, in implementations in which processor 108 includes multiple processing units, one or more of components 112, 114, 116, 118, 120, 122 may be located remotely from the other components. The description of the functionality provided by the different components 112, 114, 116, 118, 120, 122 described below is for illustrative purposes, and is not intended to be limiting, as any of components 112, 114, 116, 118, 120, 122 may provide more or less functionality than is described. For example, one or more of components 112, 114, 116, 118, 120, 122 may be eliminated, and some or all of its functionality may be provided by other ones of components 112, 114, 116, 118, 120, 122. As another example, processor 108 may be configured to execute one or more additional components that may perform some or all of the functionality attributed below to one of components 112, 114, 116, 118, 120, 122.

Figure 10:
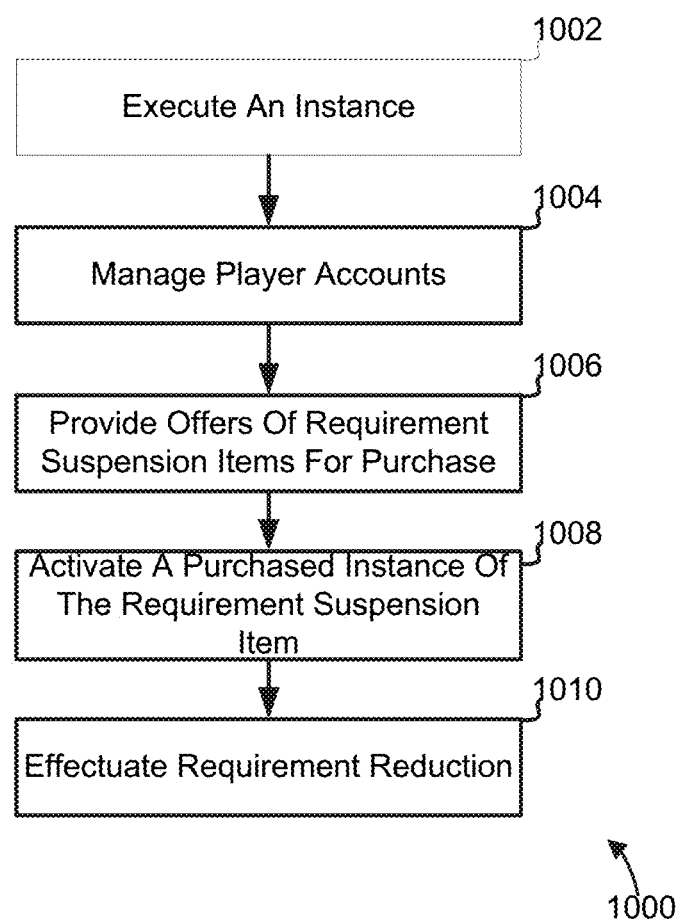
FIG. 10 illustrates one exemplary method for facilitating game action requirement reduction in an online game in accordance with the disclosure.

FIG. 10 illustrates one exemplary method 1000 for facilitating activity requirement reduction in an online game in accordance with the disclosure. The operations of method 1000 presented below are intended to be illustrative. In some embodiments, method 1000 may be accomplished with one or more additional operations not described, and/or without one or more of the operations discussed. Additionally, the order in which the operations of method 1000 illustrated in FIG. 10 and described below is not intended to be limiting.

In some embodiments, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, an instance of game space of an online game may be executed. Players may input commands with specific parameters to undertake specific deeds, maneuvers, actions, functions, spheres of actions and/or any other types of interactions within the game space executed in operation 1002. Executing the instance of the game space may include providing game actions in the game space. Common examples of game actions that may be provided in the game space may include construction, crafting, researching, training, harvesting, mining, troop recruiting, troop marching, quest, upgrading, and/or any other types of game actions in the game space. Typically, execution of a given game action may be associated with a resource requirement. The resource requirement for the given game action may specify a set of resources that will be consumed during the execution (or upon the execution) of the given game action. Execution of some game actions in the game space may require wait periods until completion. Such wait periods may be determined by the provider, administrator, moderator, and/or any other entities related to the game space to reflect processes associated with execution of these actions in the game space. In some implementations, operation 1002 may be performed by a game component the same as or similar to game component 112 (shown in FIG. 1 and described herein).

At operation 1004, player accounts may be managed for the players of the online game. The player accounts managed on operation 1004 may include a first player account associated with a first player of the online game. In some implementations, operation 1004 may be performed by a player component the same as or similar to player component 114 (shown in FIG. 1 and described herein).

At operation 1006, offers of instances of requirement reduction items may be provided in a store interface for purchase. The requirement reduction items offered for purchase in operation 1006 may include wait-period requirement reduction items, resource requirement reduction items, and/or any other requirement reduction item. An instance of a wait-period reduction item offered in operation 1006 may specify that wait-periods of game action. In some implementations, operation 1006 may be performed by store component the same as or similar to store component 116 (shown in FIG. 1 and described herein).

At operation 1008, a purchased instance of the requirement reduction item may be activated in the game space. For example, an instance of the requirement reduction item, wait-period reduction item, and/or any other requirement reduction items purchased by the player may be activated in the game space. In some implementations, operation 1008 may be performed by an activation component the same as or similar to activation component 122 (shown in FIG. 1 and described herein).

At operation 1010, requirements for game actions such as resource requirements, wait-period requirements, and/or any other requirements may be reduced for a time period in accordance with the instance of the requirement reduction item activated in operation 1008. In some implementations, operation 1010 may be performed by a activation component the same as or similar to activation component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating activities in an online game, the system comprising:
   one or more physical processors configured by machine-readable instructions to:
   execute an instance of a game space in which the online game takes place, and to implement the instance of the game space to facilitate participation of players in the online game via interaction of the players with the game space and/or each other by executing game actions on behalf of the players in the game space in response to receiving player requests over a network from client computing platforms associated with the players, the executed game actions including game actions whose initiations require resource requirements and whose execution requires wait-periods for completion;
   manage players accounts associated with individual players in the game space, the player accounts comprising player information regarding individual players, the player information including information indicating balances of stored consideration associated with the individual players, the player accounts including a first player account;
   provide, through a store interface, offers to sell instances of a first resource requirement reduction item for purchase by the players, the first resource requirement reduction item being associated with a corresponding time period; and
   receive over the network from the client computing platforms associated with the players, activation requests and activate the instances of the first resource requirement reduction item purchased by the players in the online game such that responsive to purchase of a first instance of the first resource requirement reduction item by the first player, and further in response to a request to activate the first instance of the first resource requirement reduction item from the first player, the first instance of the first resource requirement reduction item is activated in the online game resulting in resource requirements for initiating game actions requested by the first player being reduced during the time period corresponding to the first resource requirement reduction item subsequent to the activation, wherein the activation of the first instance of the first resource requirement reduction item by the first player does not alter the wait-periods for the game actions, and wherein the wait-periods are associated with a separate cost for reducing the wait-periods such that reducing the resource requirements for initiating the game actions by activating the first resource requirement reduction item does not alter the wait-periods.

2. The system of claim 1, wherein the time period corresponding to the first resource requirement reduction item is a real-world time period.

3. The system of claim 1, wherein the time period corresponding to the first resource requirement reduction item is a time period during which the player interacts with the game space.

4. The system of claim 1, wherein the resource requirements for initiating game actions requested by the first player is reduced to zero during the time period corresponding to the first resource requirement reduction item subsequent to the activation.

5. The system of claim 1, wherein the first instance of the first resource requirement reduction item is purchased by the first player for an amount of stored consideration, the stored consideration including virtual currencies, points, virtual items, and/or real-world money credits.

6. The system of claim 1, wherein one or more physical processors configured by machine-readable instructions to sell instances of a second resource requirement reduction item, the second resource requirement reduction item being associated with a corresponding time period that is different from the time period corresponding to the instances of the first resource requirement reduction item.

7. The system of claim 1, wherein the first resource requirement item is further associated with a corresponding action type such that the game actions whose resource requirements are reduced during the time period corresponding to the first resource requirement reduction item subsequent to the activation are of the corresponding action type.

8. The system of claim 7, wherein the action type corresponding to the first resource requirement reduction item includes construction, crafting, researching, training, harvesting, mining, troop marching, upgrading, or quest.

9. A method for facilitating activities in an online game, the method being implemented in one or more physical processors, the method comprising:

executing an instance of a game space in which the online game takes place, and to implement the instance of the game space to facilitate participation of players in the online game via interaction of the players with the game space and/or each other by executing game actions on behalf of the players in the game space in response to receiving player requests over a network from client computing platforms associated with the players, the executed game actions including game actions whose initiations require resource requirements and whose execution requires wait-periods for completion;

managing players accounts associated with individual players in the game space, the player accounts comprising player information regarding individual players, the player information including information indicating balances of stored consideration associated with the individual players, the player accounts including a first player account;

providing, through a store interface, offers to sell instances of a first resource requirement reduction item for purchase by the players, the first resource requirement reduction item being associated with a corresponding time period; and receiving over the network from the client computing platforms associated with the players, activation requests and activate the instances of the first resource requirement reduction item purchased by the players in the online game such that responsive to purchase of a first instance of the first resource requirement reduction item by the first play, and further in response to a request to activate the first instance of the first resource requirement reduction item from the first player, the first instance of the first resource requirement reduction item is activated in the online game resulting in resource requirements for initiating game actions requested by the first player being reduced during the time period corresponding to the first resource requirement reduction item subsequent to the activation, wherein the activation of the first instance of the first resource requirement reduction item by the first player does not alter the wait-periods for the game actions, and wherein the wait-periods are associated with a separate cost for reducing the wait-periods such that reducing the resource requirements for initiating the game actions by activating the first resource requirement reduction item does not alter the wait-periods.

10. The method of claim 9, wherein the time period corresponding to the first resource requirement reduction item is a real-world time period.

11. The method of claim 9, wherein the time period corresponding to the first resource requirement reduction item is a time period during which the player interacts with the game space.

12. The method of claim 9, wherein the resource requirements for initiating game actions requested by the first player is reduced to zero during the time period corresponding to the first resource requirement reduction item subsequent to the activation.

13. The method of claim 9, wherein the first instance of the first resource requirement reduction item is purchased by the first player for an amount of stored consideration, the stored consideration including virtual currencies, points, virtual items, and/or real-world money credits.

14. The method of claim 9, further comprising selling instances of a second resource requirement reduction item, the second resource requirement reduction item being associated with a corresponding time period that is different from the time period corresponding to the instances of the first resource requirement reduction item.

15. The method of claim 9, wherein the first resource requirement item is further associated with a corresponding action type such that the game actions whose resource requirements are reduced during the time period corresponding to the first resource requirement reduction item subsequent to the activation are of the corresponding action type.

16. The method of claim 15, wherein the action type corresponding to the first resource requirement reduction item includes construction, crafting, researching, training, harvesting, mining, troop marching, upgrading, or quest.

* * * * *